United States Patent
Mattie et al.

(10) Patent No.: US 6,682,335 B2
(45) Date of Patent: Jan. 27, 2004

(54) HOSE MOLDING DEVICE

(75) Inventors: Dennis Michael Mattie, Collingwood (CA); Stanley David Gerynowicz, Ontario (CA); Jeffrey James Walsh, Roblin (CA)

(73) Assignee: The Goodyear Tire & Rubber Company, Akron, OH (US)

( * ) Notice: Subject to any disclaimer, the term of this patent is extended or adjusted under 35 U.S.C. 154(b) by 141 days.

(21) Appl. No.: 09/992,184

(22) Filed: Nov. 16, 2001

(65) Prior Publication Data

US 2003/0096033 A1 May 22, 2003

(51) Int. Cl.⁷ .............................................. B29C 53/08
(52) U.S. Cl. ........................ 425/393; 425/403; 425/469
(58) Field of Search ................................. 425/392, 393, 425/403, 469, DIG. 218; 249/175, 177; 264/339, 295; 428/34.1–36.92

(56) References Cited

U.S. PATENT DOCUMENTS

| | | | |
|---|---|---|---|
| 3,966,387 A | 6/1976 | Babbin et al. ............... 425/445 |
| 4,015,918 A | 4/1977 | McPhee et al. ............. 425/403 |
| 4,131,409 A | 12/1978 | Babbin ....................... 425/445 |
| 4,371,554 A | * 2/1983 | Becker ......................... 425/89 |
| 4,436,690 A | 3/1984 | Davis ......................... 264/313 |
| 5,433,902 A | 7/1995 | Leyderman ................ 264/29.1 |
| 5,445,360 A | 8/1995 | Rody .......................... 251/148 |
| 5,565,251 A | * 10/1996 | Tang et al. ................ 428/36.8 |
| 5,749,255 A | * 5/1998 | Arai ............................. 72/150 |
| 5,800,616 A | * 9/1998 | Persyn ....................... 118/719 |

* cited by examiner

Primary Examiner—Robert Davis
Assistant Examiner—Thu Khanh T. Nguyen
(74) Attorney, Agent, or Firm—Richard B. O'Planick; Nancy T. Krawczyk

(57) ABSTRACT

Disclosed is a cap for use in manufacturing a curved hose on a mandrel. The cap is a cylinder with a wall, a base, and an opening. The cap has an open groove in the wall extending from the opening towards the base. A mandrel with a curve located near the end of the mandrel is inserted into the cap, the mandrel projecting from the cap groove. The cap enables the manufacture of a curved hose with a short straight end adjacent to a curve.

11 Claims, 3 Drawing Sheets

HOSE MOLDING DEVICE

FIELD OF THE INVENTION

The present invention is directed to a hose molding device. More specifically, the present invention is directed to a molding cap into which a mandrel is inserted prior to molding a hose section to form a curved hose.

BACKGROUND OF THE INVENTION

Curved hose is typically manufactured by positioning a pre-cut length of a pre-cut length of hose carcass over a curved mandrel and then heating and curing the carcass to define a curved hose. The curved hoses may have any desired configuration, the final configuration limited only by the ability to manufacture any complicated configuration. Curing of the hose length may occur on a short mandrel or a fixed, multi-pieced mandrel, as disclosed in both U.S. Pat. Nos. 4,015,918 and 4,436,690.

The mandrel disclosed in U.S. Pat. No. 4,015,918 is a conventional one-piece curved mandrel. A groove is located at the end of the mandrel for securing a collar onto the mandrel after a hose length is inserted onto the mandrel. At the opposing end of the mandrel is a collar, against which the hose length abuts when the hose length is inserted onto the mandrel. Past the collar is a means for supporting the mandrel during use; that is, for securing the mandrel to a curing rack.

Other mandrels may not have an attached collar and mounting device but may employ a mounting cap. The mounting cap fits onto the mounting end of the mandrel, with the mandrel end extending through a central opening at the bottom of the cap. The mandrel end secured into a mounting block. The block then fits into a slot on a curing rack. The conventional mounting cap is a hollow circular tube, with a wide round opening at the first end, and a smaller opening at the second end through which the mandrel extends.

However, sometimes, the use of a mounting cap can interfere with the formation of particular hose configurations. This is particularly true when a hose with bend and a short straight end must be manufactured. If a bend is located near the end of the mandrel, the bend may rest directly on the top of the mounting cap. This can create rubber plough back, creating imperfect hoses.

SUMMARY OF THE INVENTION

The present invention is directed to a cap designed to overcome the limitations of the conventional mounting caps, resulting in the manufacture a more uniform curved hose.

The present invention is a cap for use in manufacturing a curved hose on a mandrel. The cap is a cylinder with a wall, a base, and an opening. The cap has an open groove in the wall extending from the opening towards the base.

In one aspect of the invention, the groove in the cap wall extends about halfway along the length of the cap.

In another aspect of the invention, the groove has a width of about one-third of the circumference of the cap.

In another aspect of the invention, the opening of the groove is inclined at a sloping angle to create a smoothly sloping lip entrance to the groove.

BRIEF DESCRIPTION OF THE DRAWINGS

The invention will be described by way of example and with reference to the accompanying drawings in which.

DETAILED DESCRIPTION OF THE INVENTION

With reference now to the drawings, and in particular to FIGS. 1 to 3c, a curing cap for curved hoses embodying the principles and concepts of the present invention will be described.

Figure 1:
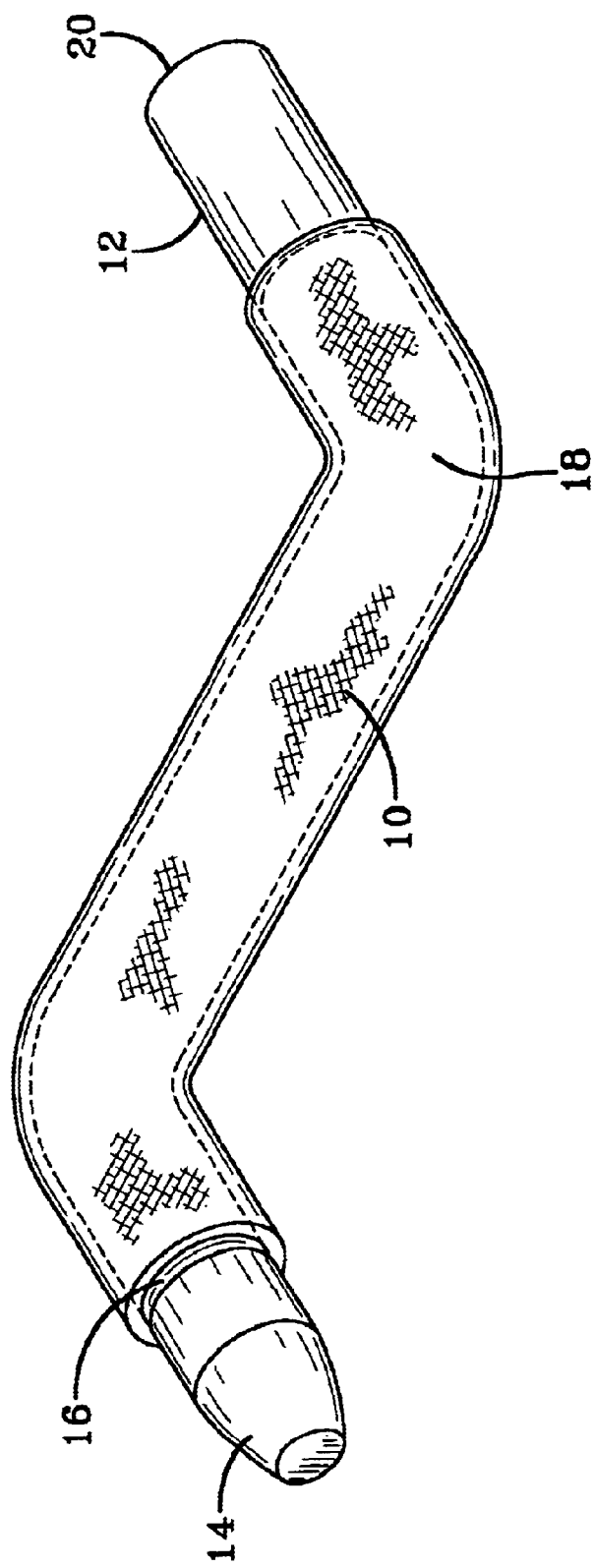
FIG. 1 illustrates a hose length on a mandrel.

A hose carcass length 10 is inserted onto a curved mandrel 12 for curing, see FIG. 1. The mandrel 12 has a tapered insertion end 14, with an adjacent locking groove 16, at least one bend 18, and a mounting end 20. For ease of insertion and removal of the hose length 10, either the inside of the hose length 10 or the mandrel 12 is provided with a lubricant.

While the illustrated mandrel 12 has two bends 18, one skilled in the art will appreciate that the exact configuration may vary and is dependant upon the intended application of the cured hose. At a preferred minimum, but not required for the present invention, the mandrel 12 has at least one bend 18 located near the mounting end 20 to form a hose with a short straight length near the hose end. However, as will be further understood, the present invention may be employed regardless of the configuration of the mandrel 12 and the hose to be formed.

Figure 2:
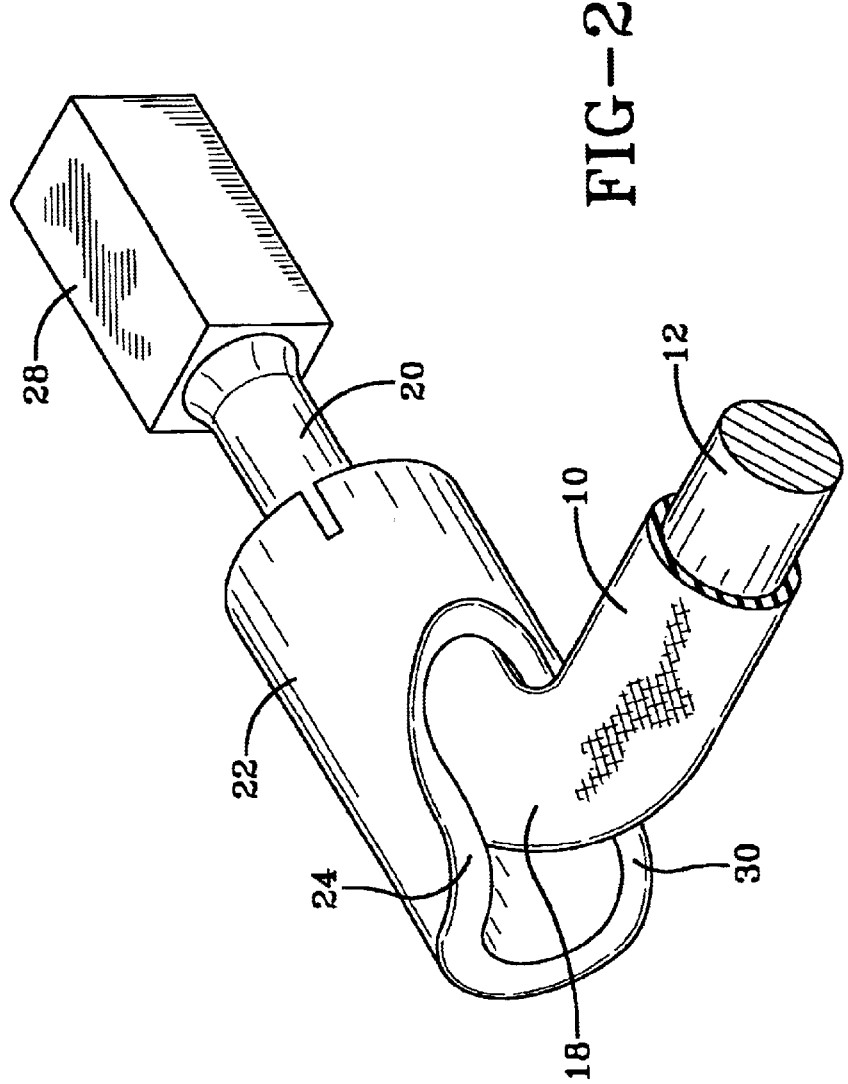
FIG. 2 illustrates a hose length and mandrel with a cap constructed in accordance with the present invention.

The mounting end 20 of the mandrel 12 is inserted into a mold cap 22, see FIG. 2. The mold cap 22 is a hollow, thick-walled cylinder, but, in accordance with the present invention, a wide mouth groove 24 is provided along the length of the cap 22. The mandrel bend 18 and the accompanying hose length 10 project out of the groove 24. The mounting end 20 of the mandrel 12 extends out of the bottom 26 of the cap 22 and is secured into the mounting block 28. The mounting block 28 is positioned in the curing rack which moved into and out of a vulcanizing unit.

Figure 3C:
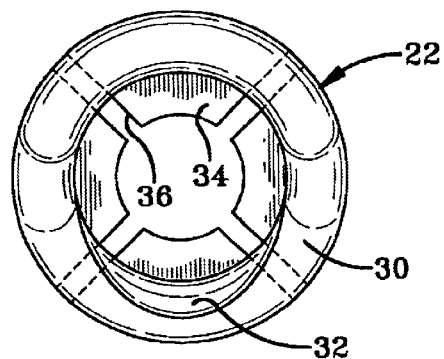
FIG. 3c is a overhead view of the inventive cap.
Figures 3A, 3B:
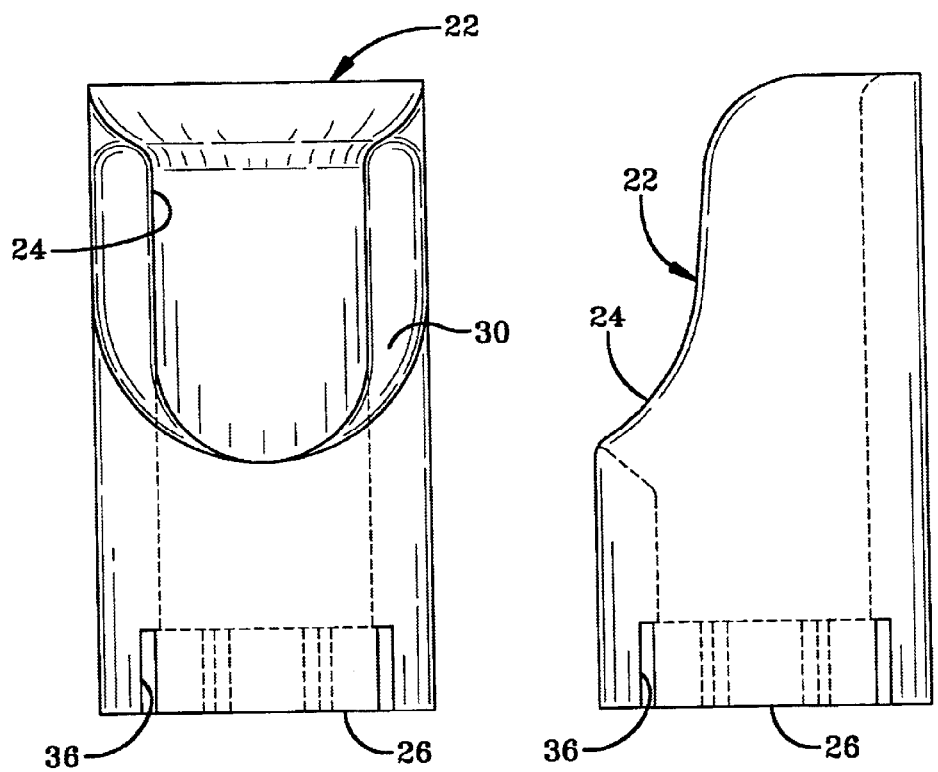
FIG. 3a is a front view of the inventive cap.
FIG. 3b is an side view of the inventive cap.

The cap 22 is better illustrated in FIGS. 3a to 3c. The groove 24 extends about halfway down the length of the cap 22 and has a width of at least a third of the circumference of the cap 22. The groove 24 may have a greater length if needed by the position of the bend 18 in the mandrel 12. Whatever the length of the groove 24 relative to the length of the cap 22, the primary requirement is that no part of the bend 18, and the hose length 10, rest on any lip portion 30 of the groove 24. The width of the groove 24 is also dependant upon the size of the mandrel 12 and hose length 10 to be inserted into the cap 22. Similar to the length, the width of the groove 24 must be sufficient to prevent any contact between the hose length 10 and the cap 22. The entire lip 30 of the groove 24 is also formed at a sloping angle to form a smooth continuous lip 30 around the entire groove 24.

The inside portion of the cap 24 located adjacent the lowermost part of the groove 24, extending toward the base 26, may also be provided with an indentation 32 to assist in controlling flow of the hose length 10 during curing. The indentation 32 is smoothly sloped.

When the hose length 10 and mandrel 12 are in the cap 22, the end of the hose length 10 may abut against the base ring 34. If the operator is loading a mandrel 12 already mounted in the cap 22 and the block 28, when he feels the end of the hose length 10 hit the base ring 34, he knows that the hose length 10 is fully inserted onto the mandrel 12.

The base ring 34 is also provided with a number of lube venting slots 36. Any number of such slots 36 may be located at any position about the base ring 34. The illustrated cap 22 has a set of equally spaced four slots 36. Lubrication from the hose length 10 and mandrel 12 may vent out these slots 36 prior to and during curing of the hose length 10.

By placing a groove 24 in the cap 22, a more uniform product may be produced. By preventing contact between the cap 22 and the hose length 10, unfavorable markings and wall gauge variations in the cured hose are prevented.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A curing cap for use in manufacturing a curved hose on a mandrel, wherein the cap is a cylinder with an opening, a base, and a wall between the opening and the base, the cap being characterized by an open groove extending through the wall and extending from the opening partially along the length of the cap towards the base.

2. A curing cap in accordance with claim 1 wherein the groove extends about halfway along the length of the cap.

3. A curing cap in accordance with claim 1 wherein the groove has a width of about one-third of the circumference of the cap.

4. A curing cap in accordance with claim 1 wherein the opening of the groove is inclined at a sloping angle.

5. A curing cap in accordance with claim 1 wherein the opening and the groove communicate with an axial bore extending through the cap from the opening to the base and the cap includes a rearward cylindrical portion enclosing the axial bore and extending along the length of the cap from an end of the groove to the base.

6. A curing cap in accordance with claim 5 wherein the groove is substantially U-shaped defined by a continuous lip extending about the groove from the opening to the cap rearward cylindrical portion.

7. A curing cap in accordance with claim 1 wherein the groove is substantially U-shaped defined by a continuous lip extending about the groove.

8. A curing cap for use in manufacturing a curved hose on a mandrel, wherein the cap is a cylinder with an axial bore and an opening in communication with the axial bore, a base, and a wall between the opening and the base, the cap being characterized by a substantially U-shaped open groove extending through the wall in communication with the axial bore and extending from the opening partially along the length of the cap toward the base.

9. A curing cap in accordance with claim 8 wherein the cap includes a rearward cylindrical portion enclosing the axial bore and extending along the length of the cap from a rearward end of the groove to the base.

10. A curing cap in accordance with claim 9 wherein a portion of the axial bore (extending through the cylindrical rearward portion of the cap is dimensioned for receipt of a straight segment of a hose-ensheathed mandrel and the groove is dimensioned to allow a curved segment of the hose-ensheathed mandrel to exit the axial bore.

11. A curing cap in accordance with claim 10, wherein the groove extends from the opening at a sloping angle and is defined by a continuous lip extending about the groove.

* * * * *